United States Patent
Ito et al.

(10) Patent No.: US 6,788,346 B2
(45) Date of Patent: *Sep. 7, 2004

(54) CAMERA INFORMATION RECORDING APPARATUS FOR RECORDING IMAGE DATA IN AN OPTICAL DISK WHEREIN MANAGING INFORMATION IS STORED WHEN THE RESIDUAL STORAGE OF A BATTERY DECREASES

(75) Inventors: Tamotsu Ito, Ayase (JP); Tsukasa Hasegawa, Hiratsuka (JP); Atsushi Saito, Hino (JP); Shigemitsu Higuchi, Fujisawa (JP)

(73) Assignee: Hitachi, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/022,238

(22) Filed: Dec. 20, 2001

(65) Prior Publication Data

US 2002/0044508 A1 Apr. 18, 2002

Related U.S. Application Data

(63) Continuation of application No. 09/810,405, filed on Mar. 19, 2001, now Pat. No. 6,347,068, which is a continuation of application No. 09/121,886, filed on Jul. 24, 1998, now Pat. No. 6,243,340.

(30) Foreign Application Priority Data

Aug. 7, 1997 (JP) .............................................. 9-212880

(51) Int. Cl.[7] .............................................. H04N 5/225
(52) U.S. Cl. ..................... 348/372; 369/53.2; 386/117
(58) Field of Search ......................... 369/53.2; 386/120, 386/117; 358/909.1; 348/372

(56) References Cited

U.S. PATENT DOCUMENTS

| 4,788,672 A | 11/1988 | Toyooka et al. |
| 4,827,462 A | 5/1989 | Flannagan et al. |

(List continued on next page.)

FOREIGN PATENT DOCUMENTS

| EP | 0823816 A2 | * 2/1998 | ............ H04N/5/77 |
| JP | 60-61731 | * 4/1985 | ............ G03B/7/26 |
| JP | 06-325482 | 11/1994 | |
| JP | 07-161125 | 6/1995 | |
| JP | 08-203210 | 8/1996 | |
| JP | 08-329472 | 12/1996 | |
| JP | 09/115269 | 5/1997 | |

OTHER PUBLICATIONS

ISO/IEC 10089—First Edition, May 1, 1991, Figs. 2 & 8.
ISO/IEC JTC1/SC23/WG2N615, pps. 15 & 17.
X3B11/94–103—Proposed Specification for 130mm Optical Disk Cartridges, 1994.

*Primary Examiner*—Aristotelis M Psitos
(74) *Attorney, Agent, or Firm*—Mattingly, Stanger & Malur, PC.

(57) ABSTRACT

A video signal recording apparatus using an information recording medium, having: a unit for identifying and detecting a WO type information recording medium and a rewritable type information recording medium; a control unit for each of the WO type information recording medium and the rewritable type information recording medium; and a display apparatus for displaying a detection result of the detecting unit. In the video signal recording apparatus using the information recording medium, file management information to form a directory is recorded as intermediate information onto the information recording medium.

6 Claims, 10 Drawing Sheets

U.S. PATENT DOCUMENTS

| | | | |
|---|---|---|---|
| 4,841,504 A | * 6/1989 | Yamaguchi et al. | 369/32 |
| 4,958,314 A | 9/1990 | Imai et al. | |
| 4,989,195 A | 1/1991 | Suzuki | |
| 5,005,088 A | 4/1991 | Fukushima et al. | |
| 5,124,963 A | 6/1992 | Ando | |
| 5,136,569 A | 8/1992 | Fennema et al. | |
| 5,177,728 A | * 1/1993 | Otsubo et al. | 369/53.2 X |
| 5,276,665 A | * 1/1994 | Aoki et al. | 369/53.2 |
| 5,309,249 A | * 5/1994 | Ishii | 386/105 |
| 5,315,570 A | * 5/1994 | Miura et al. | 369/42.24 |
| 5,491,807 A | 2/1996 | Freeman et al. | |
| 5,499,221 A | * 3/1996 | Ito et al. | 369/53.22 |
| 5,521,896 A | 5/1996 | Bajorek et al. | |
| 5,544,137 A | 8/1996 | Ohara et al. | |
| 5,559,778 A | 9/1996 | Inokuchi et al. | |
| 5,631,712 A | * 5/1997 | Suh et al. | 348/705 |
| 5,642,458 A | 6/1997 | Fukushima et al. | |
| 5,706,367 A | * 1/1998 | Kondo | 302/236 |
| 5,805,474 A | * 9/1998 | Danielson et al. | 364/708.1 |
| 5,854,875 A | 12/1998 | Yaamagishi | |
| 5,914,929 A | * 6/1999 | Kato et al. | 369/75.2 |
| 5,940,353 A | * 8/1999 | Tani | 369/53.21 X |
| 5,940,853 A | 8/1999 | Ooi et al. | |
| 6,018,506 A | * 1/2000 | Okabe et al. | 369/32 |
| 6,058,091 A | * 4/2000 | Yokota et al. | 369/93 |
| 6,243,340 B1 | 6/2001 | Ito et al. | |
| 6,347,068 B2 | * 2/2002 | Ito et al. | 369/53.18 |

* cited by examiner

PHYSICAL ADDRESS →

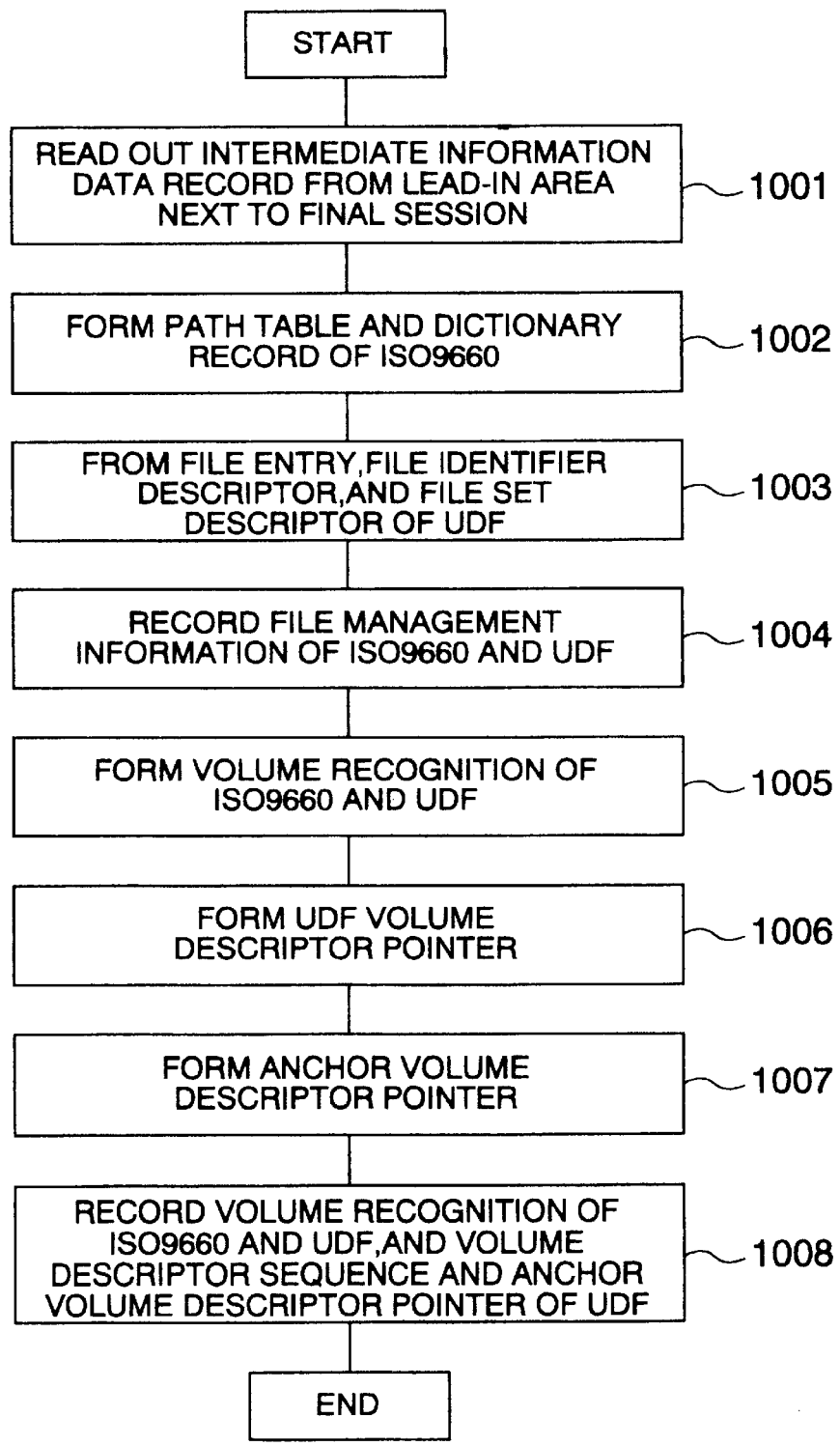

CAMERA INFORMATION RECORDING APPARATUS FOR RECORDING IMAGE DATA IN AN OPTICAL DISK WHEREIN MANAGING INFORMATION IS STORED WHEN THE RESIDUAL STORAGE OF A BATTERY DECREASES

This is a continuation application of U.S. Ser. No. 09/810,405, filed Mar. 19, 2001, now U.S. Pat. No. 6,347,068; which is a continuation application of U.S. Ser. No. 09/121,886, filed Jul. 24, 1998, now U.S. Pat. No. 6,243,340.

BACKGROUND OF THE INVENTION

The invention relates to a video signal recording apparatus and a reproducing apparatus and, more particularly, to a video signal recording apparatus and a reproducing apparatus using a small optical disk as an information recording medium and to an optical disk which is used for such apparatuses.

The recent improvement of a recording density of an optical disk apparatus is remarkable. The recording density of data which can be used by the user per unit area has been improved at a rate of 40% a year. In a DVD (Digital Versatile Disc) system using an optical disk having a diameter of 12 cm, thus, a system such that data of 4.7 GB per side can be recorded as a DVD-ROM (Read Only Memory: the overwriting is impossible), data of 3.9 GB can be likewise recorded as a DVD-R which can be overwritten only once, and further, data of 2.6 GB can be recorded as a DVD-RAM (Random Access Memory: rewritable any time) has been developed.

On the other hand, an image information compressing technique for reducing an information amount of a motion image with small deterioration in picture quality has also remarkably been progressed owing to the development of an image processing technique. Particularly, since the MPEG2 image compressing algorithm by the MPEG (Motion Picture Experts Group) has been put into practical use, the recording and reproduction of a motion image of a low rate of 4 to 5 Mbps and an adequate picture quality can be performed.

Thus, the motion image of two or more hours can be recorded into a DVD-ROM of 4.7 GB and a DVD Video player using such a disk has been put on the market.

Since the motion image of a long time can be recorded on the optical disk as mentioned above, a motion image of time that is sufficient for practical use in an apparatus using a further small optical disk can be recorded.

SUMMARY OF THE INVENTION

The invention is made in consideration of the foregoing situation and it is an object to realize a small video image recording and reproducing apparatus using a small (for example, a diameter of 8 cm) optical disk. It is another object to enable an optical disk recorded by the above apparatus to be also reproduced by the foregoing DVD Video player. Still another object is to also improve an operability of the user.

In such a recording and reproducing apparatus of the video signal, it is better that both of a write-once type (WO type) disk and a rewritable type disk can be used as an optical disk. This is because the WO type has different features such that although it is no rewritable, a recording density is high, a motion image of a long time can be recorded on the same disk, costs are generally lower than those of the rewritable type, and the like, while the rewritable type has features such that since it is freely rewritable, an image can be again recorded. It is, therefore, the first problem to enable a WO type optical disk and a rewritable type optical disk having different systems to be used by one apparatus.

The second problem is to enable the optical disk written by the present apparatus to be reproduced by a DVD Video player. The third problem is to enable an unfavorable portion to be unseen (erased) even in case of using a WO type optical disk.

To solve the first problem, a mark to distinguish the kinds of WO type optical disk and rewritable type optical disk is previously written on a cartridge or disk and means for detecting the mark is provided for a recording and reproducing apparatus, thereby enabling the kind of optical disk to be discriminated. Further, means for displaying a discrimination result to the recording and reproducing apparatus is provided, thereby preventing a mistake of the user. Means for properly controlling each optical disk is provided for the recording and reproducing apparatus, thereby performing the individual control in accordance with the discrimination result. Consequently, the optical disks of the two different systems can be used.

To solve the second problem, information which is written onto the optical disk has the same logical structure as that of an optical disk of a DVD video. For this purpose, means for recording both of a recording format called a UDF (Universal Disk Format) and the ISO9660 standard of the ISO (International Standardization Organization) as file management information is provided. Further, when there is an unrecording area on the optical disk, the DVD Video player is likely to cause an erroneous operation at a boundary between the recording area and the unrecording area. Therefore, means for recording a special signal to prevent the occurrence of the erroneous operation in the boundary portion is provided. That is, by the special signal recorded in the boundary portion, a track searching operation when a pickup jumps to a target track is normally executed without an erroneous operation. When the special signal is recorded, however, since an area where the inherent video signal can be recorded decreases, the number of times of writing the special signal is reduced. For this purpose, as for the timing to record the special signal, means for automatically recording the special signal at a timing when the optical disk is ejected, a timing when a residual amount of a battery decreases, or the like is provided. Even if the optical disk is taken out in the halfway, it is prevented that the special signal can be recorded. With this construction, after the optical disk was taken out in the halfway, even if the user retries to load the optical disk into the same apparatus and to record, unless the previous file management information remains, final file management information including the previous file management information cannot be made. Therefore, means for recording data to make the final file management information (hereinafter, this data is called intermediate information) onto the optical disk is provided. By using the optical disk on which the intermediate information has been recorded, the final file management information can be formed from the intermediate information recorded on the optical disk. It is not always necessary to record the intermediate information onto the optical disk. It is also possible to provide storing means into the apparatus and to store the intermediate information.

As for the timing for recording the intermediate information, it can be recorded when the optical disk is ejected from the apparatus or when there is a fear such that the apparatus cannot normally record information onto the optical disk.

By the above construction, the final file management information can be made and the file management information which can be reproduced by the DVD Video player can be recorded.

The process to make the final file management information from the intermediate information recorded on the optical disk can be automatically executed by the apparatus or can be also executed by a process activating instruction of the user.

That is, by recording the intermediate information, the final file management information which can be reproduced by the DVD Video player can be made. In order to allow the track searching operation to be executed without an erroneous operation upon reproduction of the DVD player, the special signal has been recorded. Further, by reducing the number of times of recording the special signal, the recordable area on the optical disk is increased.

To solve the third problem, means for changing in a manner such that file management information on the WO type optical disk-cannot be accessed to the instructed file by an erasing instruction of the user is provided. With this construction, although the reproduction is impossible in the ordinary file management system, means for overwriting meaningless data onto the data and destroying the data is also provided for safety, thereby also enabling the data to be perfectly erased.

BRIEF DESCRIPTION OF THE DRAWINGS

FIG. 10 is a flowchart for processes to form and record file management information in FIGS. 7 and 8;

DESCRIPTION OF THE PREFERRED EMBODIMENTS

An embodiment of the invention will now be described hereinbelow with reference to the drawings.

Figure 1:
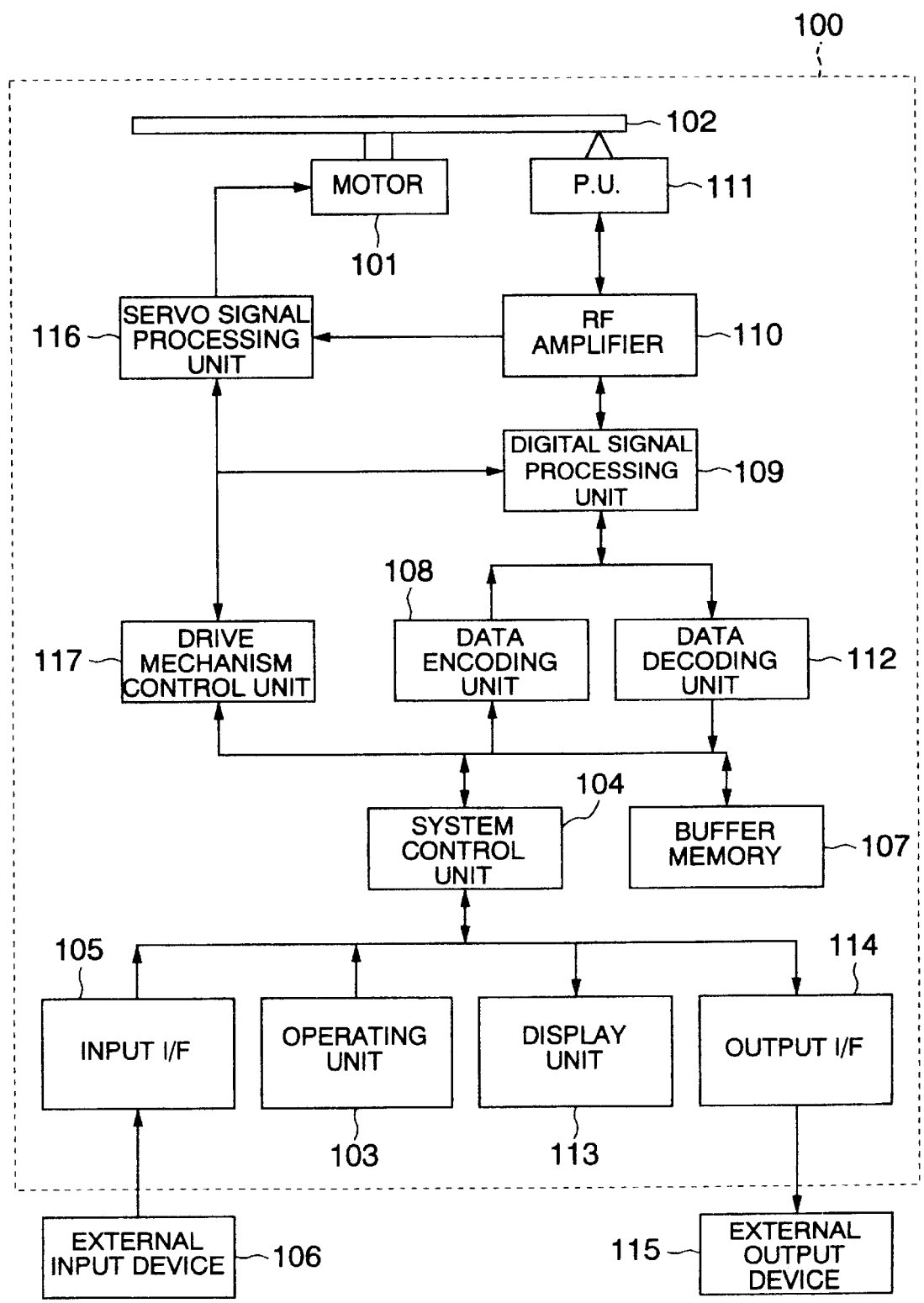
FIG. 1 is a block diagram of a video signal recording apparatus and a video signal reproducing apparatus of the invention.

FIG. 1 is a block diagram showing a block construction with respect to a video signal recording and reproducing apparatus according to the invention in which a video signal recording apparatus and a video signal reproducing apparatus are integrated.

A video signal recording and reproducing apparatus 100 executes a recording operation to an optical disk 102 attached to a motor 101 and a reproducing operation from the attached optical disk 102.

A flow of data of the recording operation is as follows. A system control unit 104 receives a recording start instruction from an operating unit 103. Under the control of the system control unit 104, input data inputted from an external input device 106 through an input interface unit 105 is stored into a buffer memory 107. The stored input data is processed by a data encoding unit 108. By a laser pickup (P.U.) 111, the processed data is stored through a digital signal processing unit 109 and a radio frequency amplifier (RF amplifier) 110 into the optical disk 102 attached to the motor 101.

A flow of data in the reproducing operation is as follows. The data of the optical disk 102 attached to the motor 101 is read by the laser pickup (P.U.) 111 and is outputted as digital data from a data decoding unit 112 through the radio frequency amplifier (RF amplifier) 110 and digital signal processing unit 109. Under the control of the system control unit 104, the digital data is outputted to a display unit 113 or an external output device 115 through an output interface unit 114.

Under the control of a drive mechanism control unit 117, a servo signal processing unit 116 generates a servo signal on the basis of a signal from the RF amplifier 110 and controls the motor 101. The drive mechanism control unit 117 controls the servo signal processing unit 116 and digital signal processing unit 109 and performs a drive control in the optical disk recording and reproducing apparatus 100.

Although the display unit 113 displays reproduction data in the embodiment, it can be also used to monitor data from the external input device 106.

As an external input device 106, a tuner for receiving a broadcasting, a digital camera, or the like is presumed. If an image input camera is used as an external input device 106 and the camera and the recording and reproducing apparatus 100 are integratedly constructed, a camera recorder (cam coder) by the optical disk can be constructed.

As an external output device 115, a video output device such as monitor television, video printer, or the like is presumed. In case of a simple image reproduction, although a screen is a small screen by an LCD, an image can be also confirmed by a display of the display unit 113.

Figure 2:
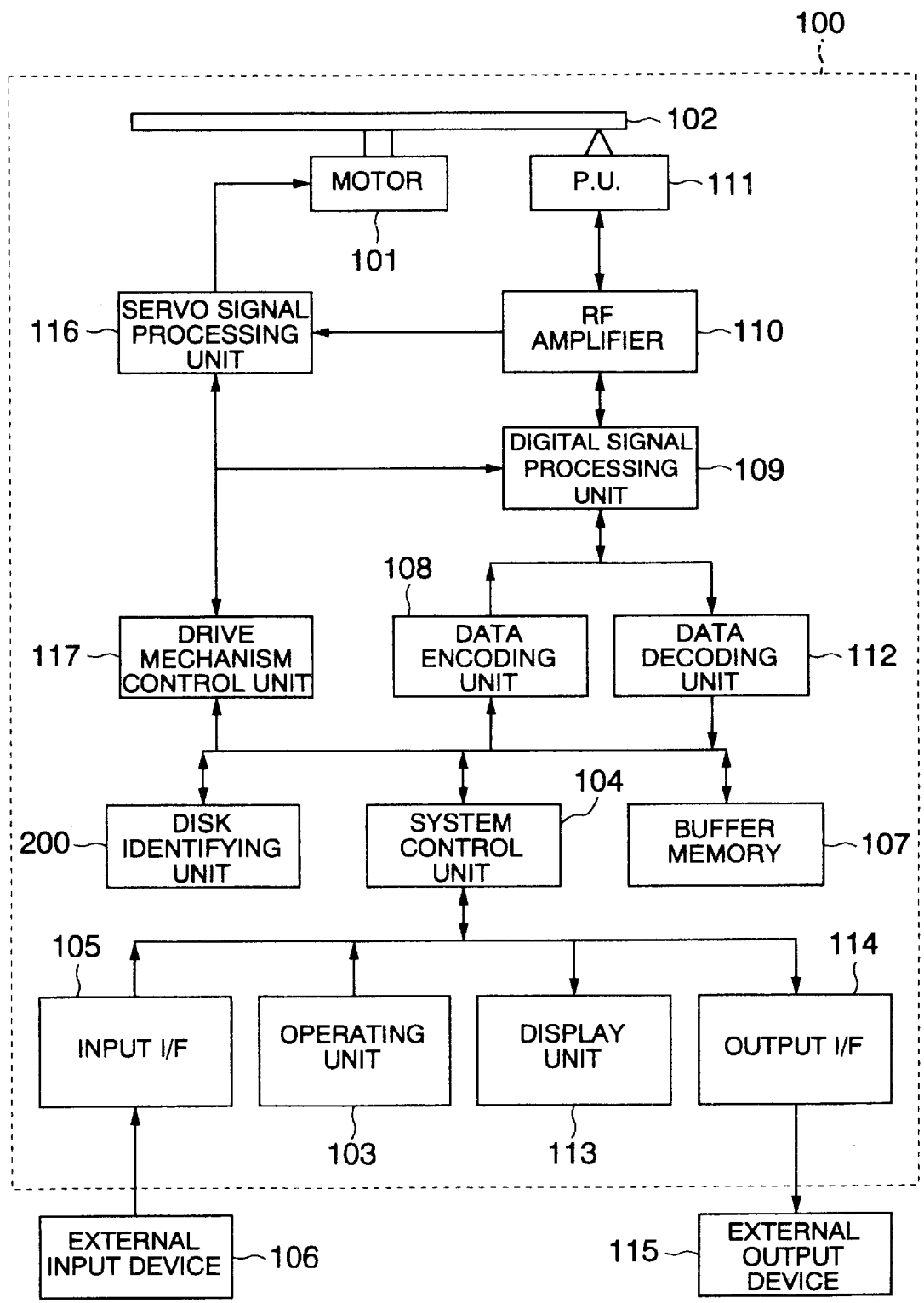
FIG. 2 is a block diagram of a video signal recording apparatus and a video signal reproducing apparatus having a disk identifying unit.

FIG. 2 is a system constructional diagram showing another embodiment of a recording and reproducing apparatus of the invention.

FIG. 2 is a construction obtained by adding a disk identifying unit 200 to the embodiment of FIG. 1.

As optical disks, there are three kinds of disks of a read only type such as CD-ROM or DVD-ROM, a rewritable type such as CD-RW or DVD-RAM, and a WO type such as CD-R or DVD-R. Since the apparatus is a recording apparatus, the optical disks as recording apparatuses include two kinds of optical disks of the rewritable type and the WO type. The disk identifying unit 200 discriminates the kind of optical disk.

In the embodiment, the optical disk is identified on the basis of a structure of a cartridge.

Figure 3:
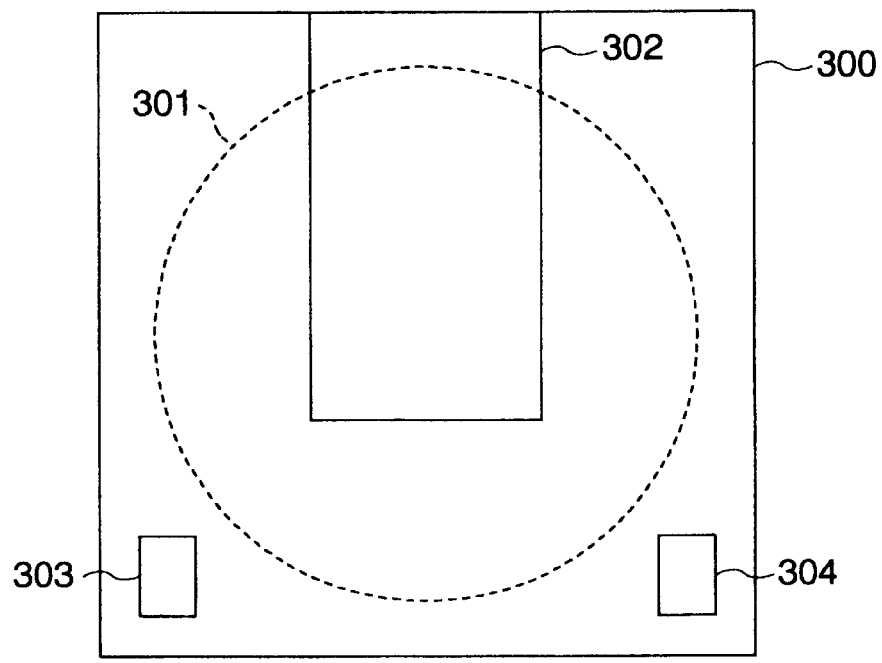
FIG. 3 is an explanatory diagram for explaining an embodiment of a cartridge.

FIG. 3 shows an embodiment of the cartridge.

An optical disk 301 is enclosed in a cartridge 300. In the cartridge 300 sole body, since a shutter 302 is closed, the optical disk 301 is not directly come into contact with the hand, thereby providing a structure adapted to protect the optical disk 301. When the optical disk is loaded into the recording and reproducing apparatus, however, the shutter 302 is opened and a laser beam is directly irradiated to the optical disk 301. Thus, the recording or reproduction can be performed to the optical disk 301.

An opening portion 303 is an opening portion which is used for write protection to prevent an erroneous writing. When the opening portion 303 is open, the recording can be performed. However, when the opening portion is closed, the recording is inhibited.

An opening portion 304 is an opening portion for identifying the optical disk. When the opening portion 304 is open, this means that the disk is a rewritable type optical disk. When the opening portion is closed, the disk is a WO type optical disk.

The disk identifying unit 200 discriminates whether the opening portion 304 is open or closed, thereby identifying either the rewritable type optical disk or the WO type optical disk.

As a method of identifying the rewritable type optical disk or the WO type optical disk, it is also possible to record identification information to discriminate the kinds of WO type and rewritable type information recording media onto an information recording medium itself and to identify the rewritable type optical disk and the WO type optical disk by using the identification information.

In the embodiment, a discrimination result of the disk is displayed on the display unit 113.

In this instance, the recording and reproducing apparatus automatically discriminates whether the loaded optical disk is the WO type or the rewritable type and automatically switches a control mode to either one of the control systems of the WO type and the rewritable type and controls. Therefore, an operability is very high. It is also possible to construct such that the apparatus automatically discriminates and merely displays or notifies a discrimination result. The user can also manually switch the control mode to the control system for each optical disk.

In case of the rewritable type optical disk, the data can be re-recorded (overwritten) to the same location. The contents of a directory in which a data file or file management information has been stored or its arrangement can be changed. However, in the WO type, since data is not re-written to the same location, a process that is peculiar to the WO type is necessary. In the embodiment, on the basis of the disk discrimination result, a processing method is changed to a processing method according to the disk, thereby coping with it.

Usually, the multi-session structure is used in the WO type.

Figure 4:
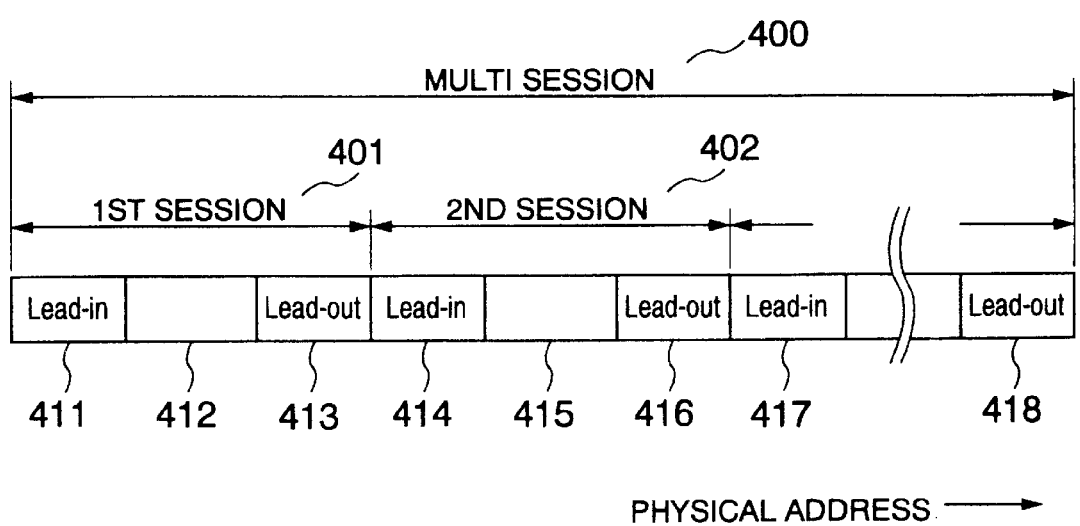
FIG. 4 is an explanatory diagram for explaining a structure of a multi-session.

FIG. 4 shows the structure of the multi-session.

In a multi-session structure 400, a plurality of sessions in each of which a Lead-in area and a Lead-out area form one pair exist.

Areas from a Lead-in area 411 to a Lead-out area 413 are set to a first session (1st session) 401, areas from a Lead-in area 414 to a Lead-out area 416 are set to a next session (2nd session) 402, a next session starts from a Lead-in area 417, and a final session is completed by areas up to a Lead-out area 418.

The 1st area 401 comprises the Lead-in area 411, a data recording area 412, and Lead-out area 413. A data recording area start address of the next session 402 has been recorded in the Lead-in area 411.

Figure 5:
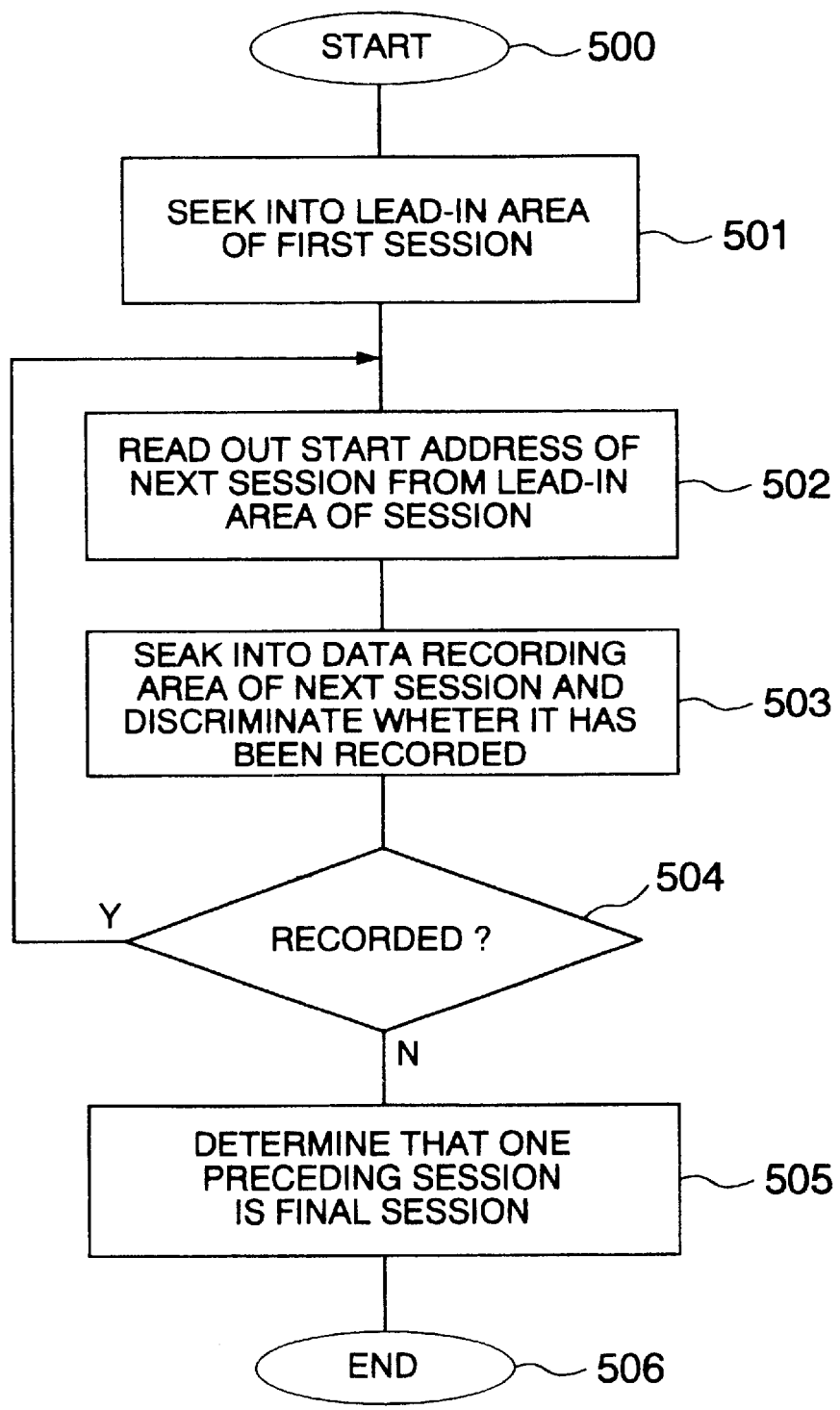
FIG. 5 is a flowchart showing a method of searching a final session.

A method of searching the final session will now be described with reference to a flowchart of FIG. 5.

The processes are started from step 500. In step 501, the pickup is moved to the Lead-in area 411 of the first session 401. A start address in a data recording area 415 of the next session 402 recorded in the Lead-in area 411 of the first session is read out (step 502). Whether the data recording area is a recorded area or not is discriminated by seeking to the start address (step 503). The processing routine advances to step 505.

When it is determined in step 505 that the data recording area is not the recorded area, step 505 follows.

In step 506, it is determined that the first Lead-in area 411 is the final session. The processing routine is finished (step 506).

In step 504, if it is decided that the data recording area is the recorded area, step 502 follows.

A start address of the data recording area of the next session recorded in the Lead-in area 414 of the session 402 is read out (step 502). Whether the data recording area is a recorded area or not is discriminated by seeking to the start address (step 503). Step 505 follows. As for this operation, the processes in steps 502 to 504 are repeated until it is confirmed that the data recording area is not the recorded area. At a time point when it is confirmed that the data recording area is not the recorded area, it will be understood that the one-preceding session is the final session.

The final session is searched by the above flow.

If the information of the directories of the previous sessions is concentrated and stored in the directory (area in which the file management information has been stored) of the final session, by merely managing the directory of the final session, the file information of the whole optical disk can be managed. In this instance, if file information to be erased is not recorded on the directory of the final session, the file has logically been deleted.

In case of the rewritable type optical disk, if information of a data file is erased or rewritten from/into the data file and the directory to manage the data file, the file cannot be erased. In the WO type disk, however, data cannot be re-recorded into the area of the same address. Therefore, the file cannot be erased in principle. According to the embodiment, since the information of the data file to be erased from the directory of the final session is not recorded, thereby logically realizing the file erasure. By using the principle such that by purposely re-recording data into the area of the same address, the data cannot be read out, the data can be also physically erased.

Although a session can be also constructed each time a file is recorded, the Lead-in area and Lead-out area constructing the session are recorded each time and a using efficiency of the data area deteriorates.

In the embodiment, the session is constructed when the optical disk is ejected or the user instructs. The session construction can be also executed by an external personal computer.

Figure 6:
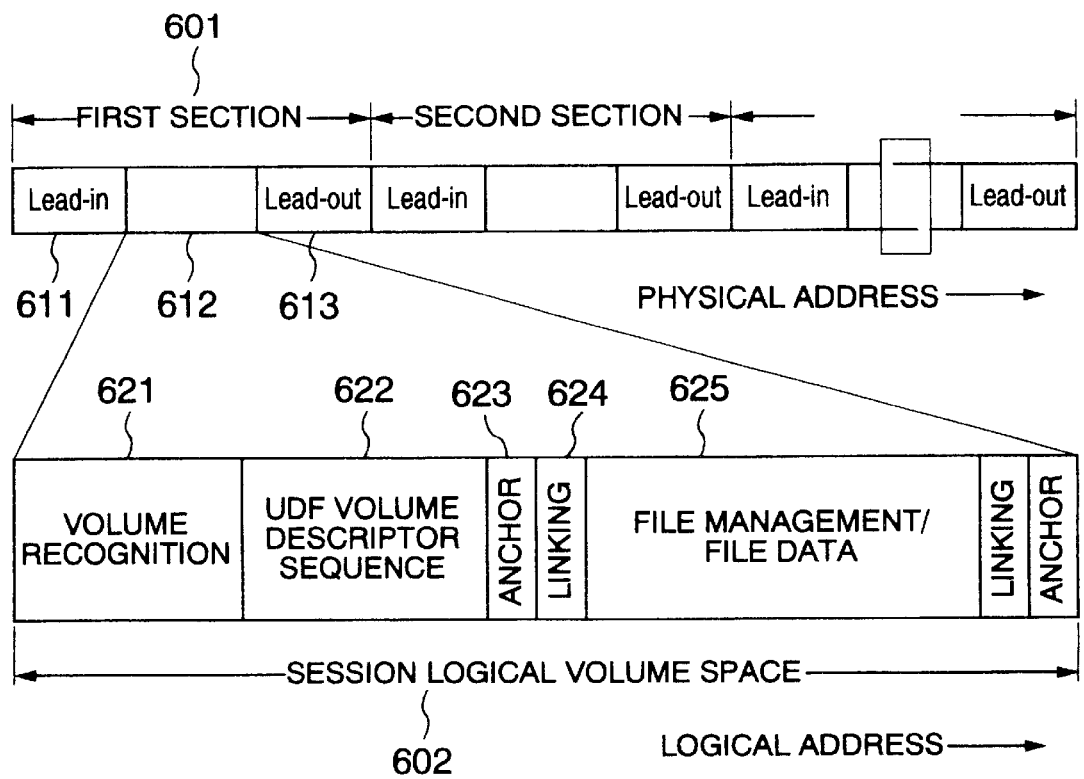
FIG. 6 is an explanatory diagram for explaining a data structure of a write once type optical disk recorded in a multi-session format in the invention.

FIG. 6 conceptually shows a data structure of a WO type optical disk recorded in the multi-session format in the invention. In FIG. 6, a session 601 comprises: a Lead-in area 611 and a Lead-out area 613; and a data area 612 to record logical volume information, files, and data to manage the files. In the multi-session format:, the sessions are continuously recorded.

As shown in a Session Logical Volume Space 602, the data area 612 is constructed by: a Volume Recognition data area 621 showing that data has been recorded in a logical format which coincides with UDF or ISO9660; a UDF Volume Descriptor Sequence area 622 showing an identity of the Session Logical Volume Space; an Anchor Volume Descriptor Pointer 623 showing a range of the Volume Descriptor Sequence area 622; a linking area 624; and a file data area 625 to record files and information to manage the files. The linking area 624 is an area that is peculiar to the WO type optical disk. In case of recording once, the linking area exerts an influence on the area just before the recording start area and makes the information in the area just before the recording start area unstable. Therefore, the linking area is provided to avoid such a problem. In case of recording into an area after the end of the already recorded portion, data is written once from the area after the position corresponding to the linking area 624 from the already recorded portion. Volumes and file structures of ISO9660 and UDF coincide with those in ISO9660: 1988 standard, OSTA (Optical Storage Technology Association) and UDF (Universal Disk Format) Specification Revision 1.50, respectively.

Formats of ISO9660 and UDF as a management structure of files to be recorded into the Session Logical Volume Space 602 will now be described hereinbelow.

Figure 7:
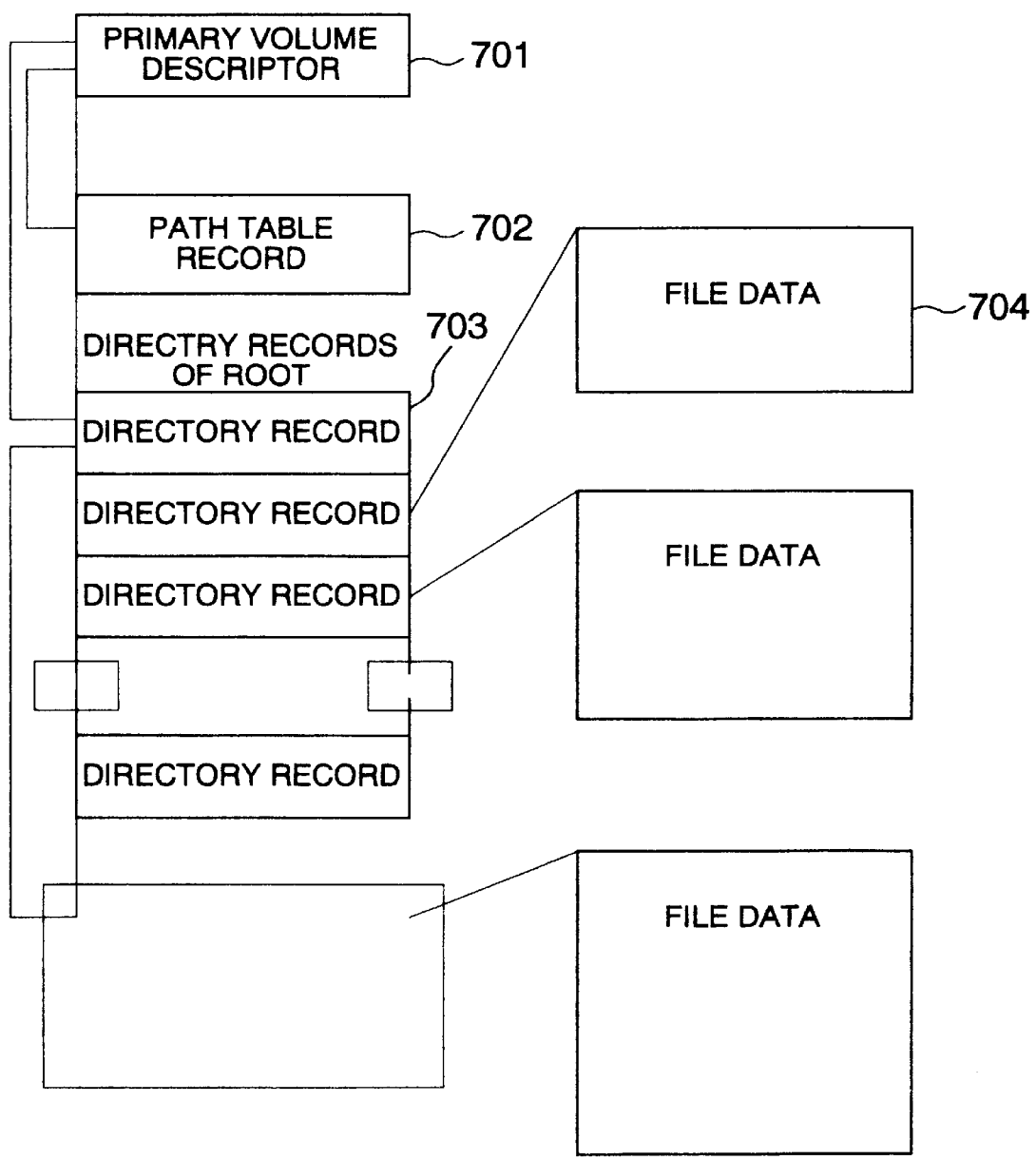
FIG. 7 is an explanatory diagram for explaining a file which is recorded in accordance with a logical format of ISO9660 and information to manage the file.

FIG. 7 conceptually shows files and information to manage the files which are recorded so as to coincide with the logical format of ISO9660. In FIG. 7, reference numeral 704 denotes a File Data to record data of files; 703 indicates a Directory Record to record a recording position and a recording range of the File Data 704, attribute information to unconditionally specify a file, and the like. The Directory Record 703 records recording positions and recording ranges of the Directory Record group, attribute information to unconditionally specify the Directory Record group, and the like and can be also hierarchically held. Reference numeral 702 denotes a Path Table Record to record recording positions, recording ranges, and the like of all of the Directory Records 703. Reference numeral 701 indicates a Primary Volume Descriptor to record the Path Table 702 and recording positions, recording ranges, and the like of the Directory Record group of the highest hierarchy.

The Primary Volume Descriptor 701 is recorded in the Volume Recognition data area 621. The other 702 to 704 are stored in the file data area 625.

Figure 8:
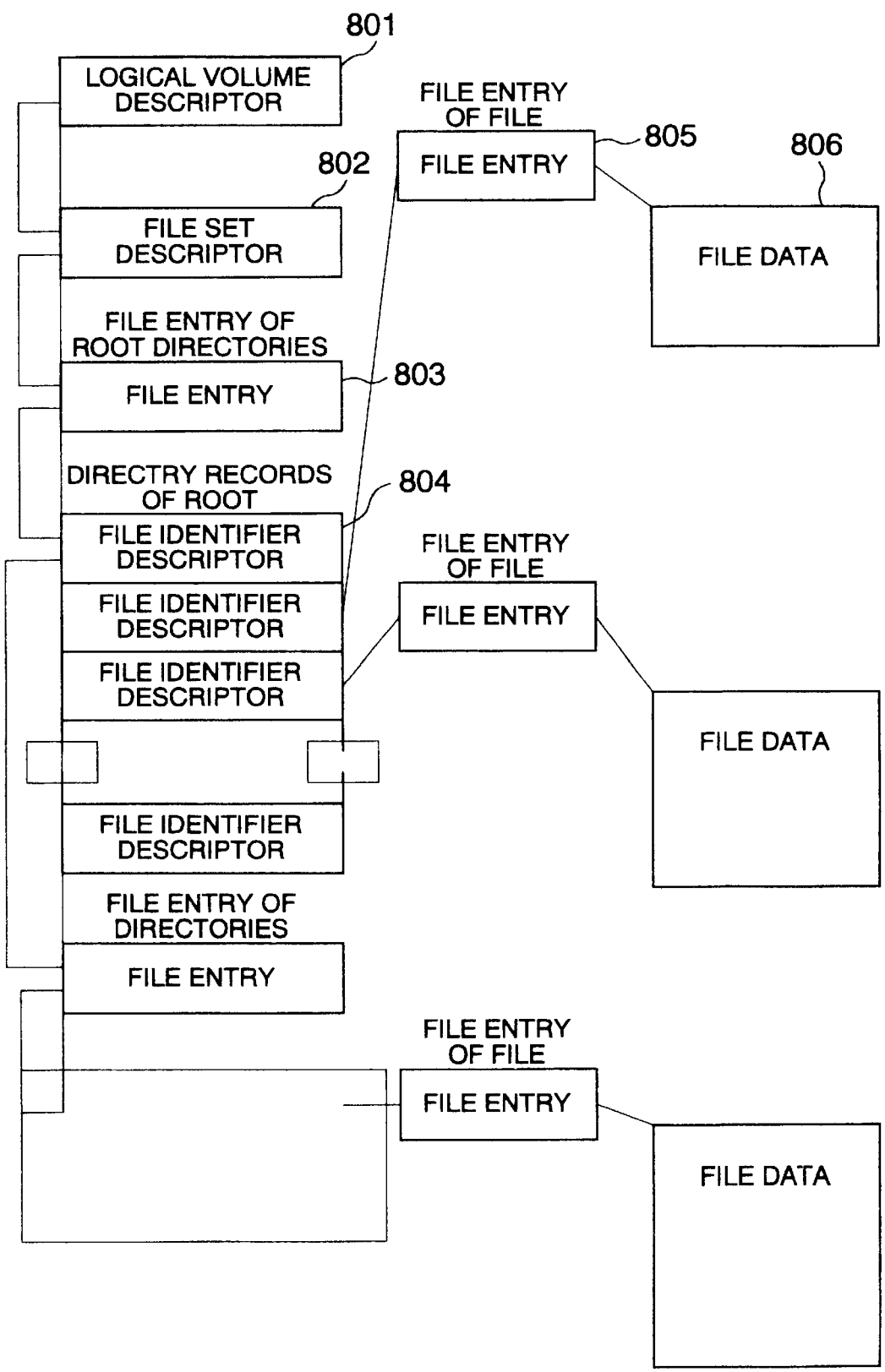
FIG. 8 is an explanatory diagram for explaining a file which is recorded in accordance with a logical format of UDF and information to manage the file.

FIG. 8 conceptually shows files which are recorded in accordance with the logical format of UDF and information to manage the files. In FIG. 8, reference numeral 806 denotes File Data to record the data of the file and coincides with the File Data 704 in FIG. 7. Reference numeral 805 denotes a File Entry to record a recording position and a recording range of the File Data 806, attribute information to unconditionally specify the file, and the like. Reference numeral 804 denotes a File Identifier Descriptor to record a recording position, a recording range, and the like of the File Entry 805. The File Entry 805 records recording positions and recording ranges of the File Identifier Descriptor group, attribute information to unconditionally specify the File Identifier Descriptor group, and the like and can be also hierarchically held. Reference numeral 802 denotes a File Set Descriptor to record a recording position and the like of the File Entry 805 of the highest hierarchy. Reference numeral 801 indicates a Logical Volume Descriptor to record the recording position, recording range, and the like.

The Logical Volume Descriptor 801 is recorded in the UDF Volume Descriptor Sequence area 622. The other 802 to 806 are recorded in the file data area 625.

The invention is constructed so as to reduce the number of times of recording the Lead-in area 611 and Lead-out area 613 without reducing the area where the video signal can be recorded. Generally, the Lead-out area 613 is an area to re-record information to specify the write-once position or the like when the WO type optical disk apparatus stops holding of the write-once position of the video signal. On the other hand, the video signal to be recorded is recorded as File Data 704 (File Data 806). Prior to recording the Lead-out area, the file management information in FIGS. 7 and 8 need to be formed and recorded so that the recorded video signal can be read out in accordance with the logical structure of ISO9660 or UDF. Therefore, even after the WO type optical disk apparatus stops holding the write-once position of the video signal, the write-once position can be specified. If the information which can form the file management information in FIGS. 7 and 8 is recorded as intermediate information onto the WO type optical disk, the number of times of recording the Lead-in area 611 and Lead-out area 613 can be reduced.

Figure 9:
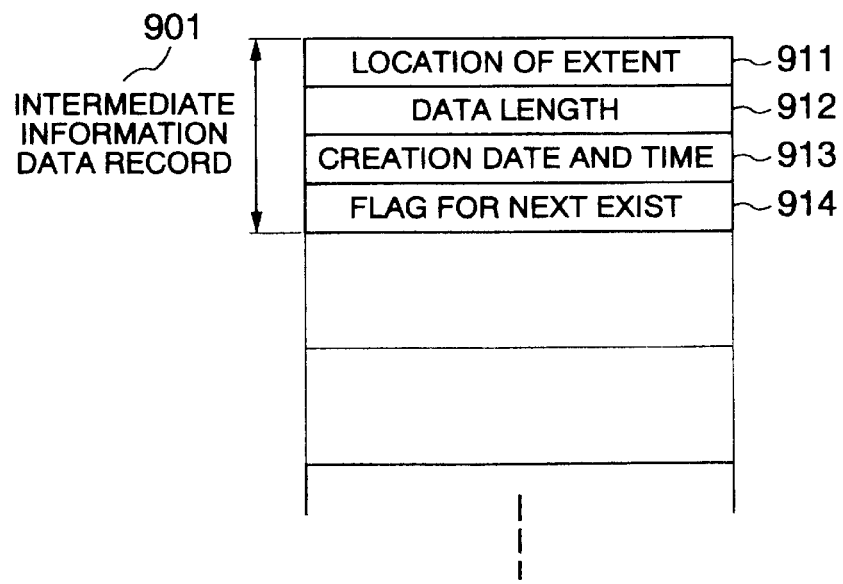
FIG. 9 is an explanatory diagram for explaining an intermediate information data structure of the invention.

FIG. 9 shows an embodiment of the intermediate information. As intermediate information, an intermediate information data record 901 is written once into the Lead-in area 611 of the write-once target session 601 one record by one every File Data 704 of the video signal to be written once. As information regarding the File Data 704 necessary to form the file management structures of FIGS. 7 and 8, the intermediate information data record 901 records at least a recording position (Location of Extent) 911, a recording size (Data Length) 912, and a recording date and time (Creation Data and Time) 913 of the File Data 704, and a flag (Flag for next exist) 914 indicative of the presence or absence of the next intermediate information data record. According to the intermediate information data structure, it will be obviously understood that the write-once position can be specified from the Location of Extent 911 and Data Length 912 of the File Data 704 of the final record of the intermediate information data record 901. That is, even after the WO type optical disk apparatus stopped holding of the write-once position of the video signal, the write-once position can be specified. In the embodiment, although the intermediate information is written once into the Lead-in area 611 of the write-once target session 601, by adding information which can specify to which session the intermediate information relates, the intermediate information can be also recorded in a Lead-out area or an area out of the volume shown in FIG. 6.

As for the timing to record the intermediate information, it can be recorded when the optical disk is ejected from the apparatus or when there is a fear that the apparatus cannot correctly record information to the optical disk, for example, when a residual amount of a battery decreases or the like.

Prior to recording the Lead-out area, a flowchart for processes to form and record the file management information of FIGS. 7 and 8 will now be described with reference to FIG. 10.

First, all of the intermediate information data record 901 is read out from the Lead-in area 611 recorded next to the final session (step 1001). From the intermediate information data record 901 read out in step 1001, the Path Table Record 702 and Directory Record 703 which coincide with the ISO9660 standard are formed (1002). The File Entry 905, File Identifier 904, and File Set Descriptor 902 which coincide with the UDF specification are formed (1003). A write-once end position is obtained from the intermediate information data record 901 read out in step 1001 and the data formed in steps 1002 and 1003 is written once from the end position (1004). Subsequently, the Volume Recognition data which coincide with ISO9660 and UDF specification is formed (1005). The UDF Volume Descriptor Sequence which coincides with the UDF specification is formed (1006). The Anchor Volume Descriptor Pointer 623 showing the range of the Volume Descriptor Sequence area 622 is formed (1007). They are recorded into the areas described in FIG. 6 (1008).

Figure 11:
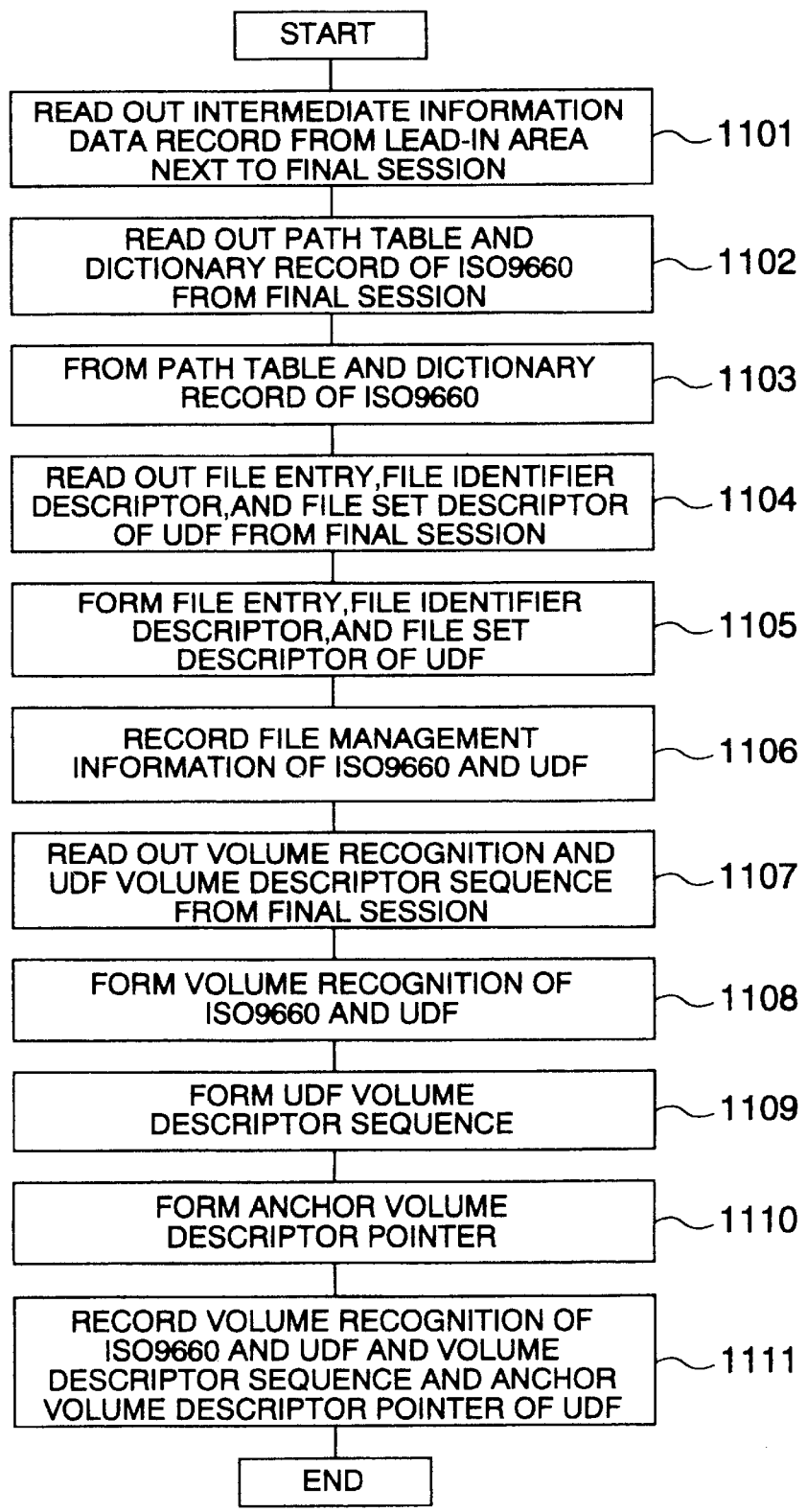
FIG. 11 is a flowchart for processes to form and record the file management information in FIGS. 7 and 8.

According to the processes described by using FIG. 10, the information to manage the files of each session 601 is recorded to only the file recorded in each session. However, for example, if such information is recorded as information to manage the files including the information to manage the files of the session just before, all of the File Data 704 of all of the sessions can be read out on the basis of the information to manage the file of the final session. The flowchart for the above processes will now be described with reference to FIG. 11.

First, all-of the intermediate information data record 901 is read out from the Lead-in area 211 recorded next to the final session (1101). Subsequently, the Path Table Record 702 and Directory Record 703 are read out from the final session (1102). From the intermediate information data record 901 read out in step 1101 and the data read out in step 1102, the Path Table Record 702 and Directory Record 703 which coincide with the ISO9660 standard are formed (1103). The File Entry 805, File Identifier 804, and File Set Descriptor 802 are read out from the final session (1104). From the intermediate information data record 901 read out in step 1101 and the data read out in step 1104, the File Entry 805, File Identifier 804, and File Set Descriptor 802 which coincide with the UDF specification are formed (1105). A write-once end position is obtained from the intermediate information data record 901 read out in step 1101 and the data formed in steps 1103 and 1105 is written once from the end position (1106). Subsequently, the Volume Recognition data and UDF Volume Descriptor Sequence are read out from the final session (1107). The Volume Recognition data 621 which coincides with ISO9660 and UDF specification is formed (1108). The UDF Volume Descriptor Sequence 622 which coincides with the UDF specification is formed (1109). The Anchor Volume Descriptor Pointer 623 showing the range of the Volume Descriptor Sequence area 622 is formed (1110). They are recorded into the areas described in FIG. 6 (1111).

In the embodiment, the information to manage the files of the session just before is read out. However, it is also possible to read out the intermediate information data records for all of the sessions and to form information to manage the files. In this case, for example, the user is allowed to designate an erasure, means for adding flag information showing that the information of the record is invalid as data of the intermediate information data record is provided, and information to manage the files is formed from only the intermediate information data record which is not invalid, so that it is also possible to prevent the designated file from being read out. Further, for safety, by providing means for overwriting meaningless data onto the designated data and destroying the data, the data can be also perfectly erased.

Figure 12:
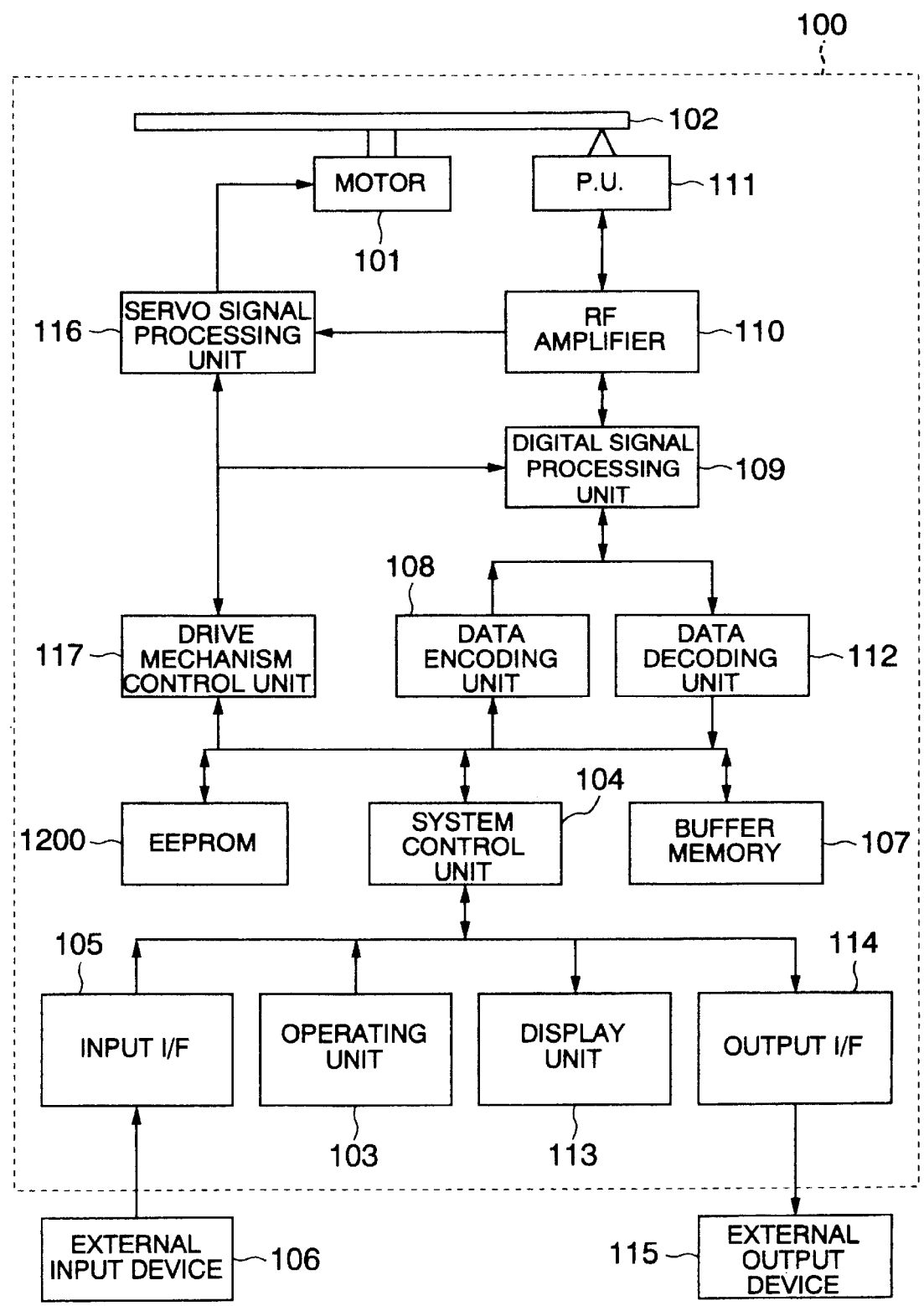
FIG. 12 is a block diagram of a video signal recording apparatus and a video signal reproducing apparatus having an EEPROM to store intermediate information.

In the embodiment of FIG. 9, although the intermediate information is recorded in the recording area of the optical disk, another embodiment for recording the intermediate information is shown in FIG. 12.

FIG. 12 has a construction obtained by adding an EEPROM 1200 to the embodiment of FIG. 1. The EEPROM 1200 has a feature such that it can be rewritten by the ordinary writing operation and the written data is held even when a power source voltage is equal to 0V. Therefore, by writing the intermediate information into the EEPROM 1200, a session can be constructed at an arbitrary time point.

The intermediate information recorded in the EEPROM 1200 can be erased when a session is constructed by using the intermediate information or after completion of a finalization (operation to finally record the Lead-out area and complete the optical disk).

To cope with a plurality of optical disks, it is necessary to record a plurality of intermediate information.

A time stamp when the intermediate information is recorded into the EEPROM 1200 is stored and when another optical disk in which the session is not completed yet is loaded, the intermediate information in which a time stamp recorded at last on the optical disk and the time stamp of the intermediate information stored in the EEPROM 1200 coincide is searched, and by using the intermediate information in which the time stamp coincides, the data can be continuously written once to the loaded optical disk.

In case of an optical disk recorded by another video signal recording apparatus and in case of an optical disk in which a session is not completed, since the intermediate information for the optical disk does not exist in the EEPROM 1200, if it is recorded to the optical disk, matching cannot be obtained. Therefore, the number of the video signal recording apparatus used upon recording (for example, manufacturing number) is recorded on the optical disk. By confirming that the number of the video signal recording apparatus which is going to record and the number of the video signal recording apparatus recorded on the optical disk coincide, the intermediate information and the optical disk can be matched.

A combination of the above two selecting methods can be also used.

In the WO type optical disk, since the session structure is used, the Lead-in area and Lead-out area exist every session and there is a problem that the user cannot accurately know a remaining recording capacity (recordable time). In the rewritable type optical disk, however, when the session is written once, by rewriting the contents in the Lead-in area of the recorded session, recording the Lead-out area of the recorded session as a data recording area, and finally recording the Lead-out area, it is possible to form a single session constructed by one session. Therefore, the remaining recording capacity (recordable time) can be accurately known.

The optical disk recorded by the recording apparatus of the invention can be reproduced by the DVD-Video player. For this purpose, it is necessary to match a file managing method which is presumed by the DVD-Video player. In the invention, the ISO9660 standard and the UDF standard are used, thereby matching the file managing method of the DVD-Video player.

According to the invention, a recording apparatus of a video signal in which the WO type optical disk and the rewritable type optical disk can be selectively used in accordance with an application can be realized. Further, a recording apparatus of an optical disk such that it can be loaded into the DVD-Video player can be realized. Moreover, a recording apparatus which can erase the recorded image for the WO type optical disk can be realized. With the above constructions, a small video signal recording apparatus having an excellent operability can be provided.

What is claimed is:

1. A camera information recording apparatus for recording image data in an optical disk comprising:
- a camera device for producing said image data;
- a data encoding unit for encoding said image data from said camera device;
- digital signal processing unit for processing the encoded data from said data encoding unit;
- an RF amplifier for amplifying the processed data from said digital signal processing unit;
- a laser pickup for recording an output data from said RF amplifier on said optical disk;
- a motor for rotating said optical disk;
- a servo signal processor for controlling the motor;
- a display device for displaying said image data from said camera device; and
- a system control unit for controlling said camera information recording apparatus, wherein managing information for managing the output data recorded on said optical disk is produced and recorded on said optical disk when said system control unit detects a decrease in a residual storage of a battery which supplies electricity to said camera information recording apparatus.

2. A camera information recording apparatus according to claim 1, wherein said optical disk is enabled to eject from said camera information recording apparatus.

3. A camera information recording apparatus according to claim 1, wherein said system control unit detects said decrease in the residual storage of the battery during recording of the output data.

4. An information recording method for a camera information recording apparatus supplied with electric power from a battery, comprising the steps of:
- producing image data;
- encoding the produced image data;
- processing the encoded image data;
- recording the processed image data on an optical disk;
- rotating said optical disk;
- displaying said image data; and
- detecting a decrease in residual storage of said battery, wherein managing information for managing the output data recorded on said optical disk is produced and recorded on said optical disk when the decrease in the residual storage of the battery is detected.

5. An information recording method according to claim 4, wherein said optical disk is enabled to eject from said camera information recording apparatus.

6. A camera information method according to claim 4, wherein said step of detecting said decrease in the residual storage of the battery is made during said step of recording.

* * * * *